United States Patent
Kamali et al.

(10) Patent No.: US 6,668,041 B2
(45) Date of Patent: Dec. 23, 2003

(54) SINGLE ENDED LINE PROBING IN DSL SYSTEM

(75) Inventors: Jalil Kamali, San Jose, CA (US); Babak H. Khalaj, Richmond Hill (CA)

(73) Assignee: Centillium Communications, Inc., Fremont, CA (US)

( * ) Notice: Subject to any disclaimer, the term of this patent is extended or adjusted under 35 U.S.C. 154(b) by 0 days.

(21) Appl. No.: 09/853,048

(22) Filed: May 9, 2001

(65) Prior Publication Data

US 2003/0026391 A1 Feb. 6, 2003

(51) Int. Cl.[7] .......... H04M 1/24; H04M 3/08; H04M 3/22
(52) U.S. Cl. .......... 379/1.04; 379/1.01; 379/22; 379/27.01; 379/24; 379/29.01; 379/30
(58) Field of Search .......... 379/1.01, 1.04, 379/9, 22, 22.01, 22.02, 22.03, 24, 27.01, 27.02, 27.03, 29.01, 29.05, 29.09, 30, 26.01, 32.01; 370/241, 242, 249, 251, 252, 253; 375/224; 340/853.2

(56) References Cited

U.S. PATENT DOCUMENTS

| | | | | |
|---|---|---|---|---|
| 4,105,995 A | * | 8/1978 | Bothof et al. | 340/146.1 |
| 4,870,675 A | * | 9/1989 | Fuller et al. | 379/22.01 |
| 5,083,086 A | | 1/1992 | Steiner | |
| 5,128,619 A | | 7/1992 | Bjork et al. | |
| 5,461,318 A | | 10/1995 | Borchert et al. | |
| 5,864,602 A | * | 1/1999 | Needle | 379/22.02 |
| 5,881,130 A | * | 3/1999 | Zhang | 379/22.02 |
| 6,002,671 A | * | 12/1999 | Kahkoska et al. | 370/248 |
| 6,084,946 A | | 7/2000 | Beierle | |
| 6,091,713 A | * | 7/2000 | Lechleider et al. | 370/248 |
| 6,177,801 B1 | * | 1/2001 | Chong | 324/520 |
| 6,215,855 B1 | * | 4/2001 | Schneider | 379/22 |
| 6,256,377 B1 | * | 7/2001 | Murphree et al. | 379/24 |
| 6,266,395 B1 | * | 7/2001 | Liu et al. | 379/27.01 |
| 6,385,297 B2 | * | 5/2002 | Faulkner et al. | 379/1.04 |
| 6,434,221 B1 | * | 8/2002 | Chong | 379/27.01 |
| 6,466,649 B1 | * | 10/2002 | Walance et al. | 379/22.03 |
| 6,487,276 B1 | * | 11/2002 | Rosen et al. | 379/1.04 |
| 6,531,879 B1 | | 3/2003 | Nero, Jr. | |
| 6,538,451 B1 | | 3/2003 | Galli et al. | |

FOREIGN PATENT DOCUMENTS

| | | |
|---|---|---|
| CA | 2281208 A1 | 2/2001 |
| EP | 0 391 312 A2 | 10/1990 |
| EP | 1 014 658 A2 | 6/2000 |
| EP | 1 073 247 A2 | 1/2001 |
| EP | 1 081 924 A2 | 3/2001 |
| WO | WO 00/27134 | 5/2000 |
| WO | WO 01/01158 A1 | 1/2001 |
| WO | WO 01/24492 A1 | 4/2001 |

OTHER PUBLICATIONS

Baker et al., "Telephone Access Network Measurements," 1998, 81 pages.

Boets et al., "The Modelling Aspect of Transmission Line Networks," Proceedings of the Instrumentation and Measurement Technology Conference, New York, May 12–14, 1992, IEEE, pp. 137–141.

Ziemann, "ADSL Line Qualification Tests," Application Note 52, Wandel & Goltermann Communications Test Solutions, Sep. 28, 2000, pp. 1–5.

PCT International Search Report, International Application No. PCT/US02/21057, Nov. 14, 2002, 4 pages.

PCT International Search Report, International Application No. PCT/US02/14470, Aug. 29, 2002, 4 pages.

(List continued on next page.)

*Primary Examiner*—Curtis Kuntz
*Assistant Examiner*—Quoc Tran
(74) *Attorney, Agent, or Firm*—Fenwick & West LLP

(57) ABSTRACT

Single ended line probing techniques for determining if a telephone line qualifies for digital subscriber line service are disclosed.

22 Claims, 8 Drawing Sheets

OTHER PUBLICATIONS

Hedlund et al., "DSL Loop Test," *Telephony*, Chicago, IL, vol. 235, No. 8, pp. 48–52, Aug. 24, 1998.

PCT International Search Report, International Application No. PCT/US02/21000, Mar. 13, 2003, 5 pages.

PCT International Search Report International Application No. PCT/US03–04614, May 16, 2003, 6 pages.

PCT Written Opinion, International Application No. PCT/US02/14470, Apr. 15, 2003, 6 pages.

* cited by examiner

SINGLE ENDED LINE PROBING IN DSL SYSTEM

FIELD OF THE INVENTION

The present invention is related to the field of digital subscriber line (DSL) communications, and in particular, to loop qualification in a DSL system.

BACKGROUND OF THE INVENTION

DSL communication systems typically use copper telephone lines for high speed data transmission. A major problem for DSL service providers is to sufficiently qualify the loop or probe the line prior to the deployment. A typical system of probing the line is shown in FIG. 1. This system requires a handset 110 to be attached to the telephone line at a central office (CO) location 130, and a second handset 112 to be attached to the telephone line at the customer premises equipment (CPE) location 140. Thus, conventional line probing requires human action at two points of the telephone line.

A circuit model, including the known resistance R of the voltage source and the unknown capacitance C(1) of the telephone line, is used as a model of the telephone line as shown in FIG. 2a. The capacitance C(1) is a function of the length 1 of the telephone line. The capacitance C(1) of the telephone line is measured by applying a direct current (DC) voltage pulse $V_{DC}$ to the telephone line, as shown in FIG. 2b, and recording the charge-up time T of the line voltage $V_{line}$, as shown in FIG. 2c. Because the charge-up time T of the line voltage $V_{line}$ is a function of the line capacitance C(1), the line capacitance can be estimated from the charge-up time T. The capacitance estimate can then be used to estimate the loop length 1 of the telephone line. The loop length in a DSL system is typically between 0.2 to 8 kilometers (Km).

However, this method cannot be used to estimate the loop length of a line that is integrated with a DSL modem board for a number of reasons. For example, conventional DSL modem boards include a line transformer to isolate the line from the CO equipment and reject the common mode voltage of the line. Due to the presence of the line transformer, a DC pulse cannot be transmitted onto the line. In addition, the resistance of the simple RC circuit of FIG. 2a includes the source resistance, but ignores the line resistance. This is a reasonable approximation of the resistance when the source resistance is much larger than the line resistance. However, in conventional DSL modem boards, the output resistance of the source is typically not significantly larger than the line resistance. As such, ignoring the line resistance degrades the accuracy of the loop length estimate.

What is needed, therefore, is a technique to qualify the loop of a DSL system.

SUMMARY OF THE INVENTION

One embodiment of the present invention provides a method for performing single ended line probing to determine if a telephone line qualifies for digital subscriber line service. The method includes transmitting low frequency signals over the telephone line, receiving reflected versions of the low frequency signals from the telephone line, measuring the transfer function of the telephone line based on the transmitted low frequency signals and received reflected versions of the low frequency signals, and qualifying the telephone line based on the transfer function.

DETAILED DESCRIPTION OF THE INVENTION

Single ended line probing techniques for performing transmission line qualification are disclosed. The resulting qualification data can be used to determine whether DSL service can be deployed on a particular transmission line. In general, the frequency response of a telephone loop coupled to a DSL modem is characterized by transmitting low frequency signals from the modem over the loop, and then receiving the reflected versions of the transmitted signals back at the DSL modem. As the input and output signals of the loop are known, the transfer function of the loop is effectively measured. Useful information (e.g., line topology) can be derived from this measured transfer function. Such information can then be used to, for example, estimate the line length and to identify the existence of a short circuit or load coil on the line. This information, in conjunction with other information (e.g., desired bit error rate), can be used to determine achievable data rate and the type of service available to that particular line.

In one embodiment of the present invention, low frequency sinusoid line probing signals are applied to the loop in question by a modem transmitter. Note that the loop can be open ended at the remote end, meaning that there is no modem coupled to the remote end of the loop. Alternatively, there may be a modem coupled to the remote end. Regardless, the transmitted line probing signals are received back from the loop by the modem receiver. The transfer function of the loop in the low frequency range is measured using the transmitted and received line probing signals. Note that this measured transfer function is from the perspective of the central office. The low frequency sinusoid line probing signals may be, for example, within the voice frequency range (e.g., 0.5 KHz to 3.5 KHz).

The single ended line probing techniques in accordance with the present invention can be implemented in hardware, software, firmware, or some combination thereof. For example, the techniques disclosed herein may be implemented on one or more application specific integrated circuits (ASICs), or as a set of instructions or codes executing on a digital signal processor (DSP) or an equivalent processing environment. The single ended line probing techniques in accordance with the present invention can be employed to: eliminate or reduce of the need for an operator to be physically present at the remote site in order to perform line probing; reduce of the time, labor, and cost needed to install a DSL line; facilitate maintenance and troubleshooting of the DSL line; minimize the required coordination with a remote site to perform loop qualification.

Figure 1:
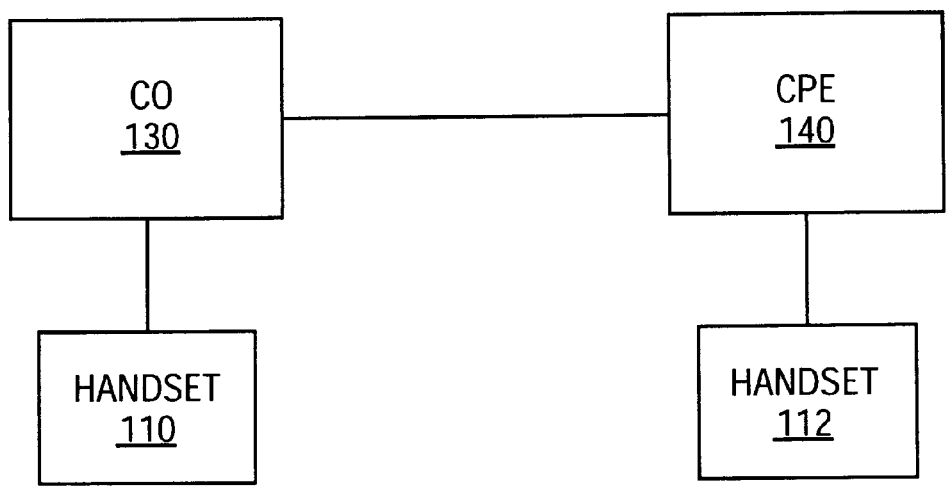
FIG. 1 shows a prior art system of probing a telephone line.
Figure 2A:
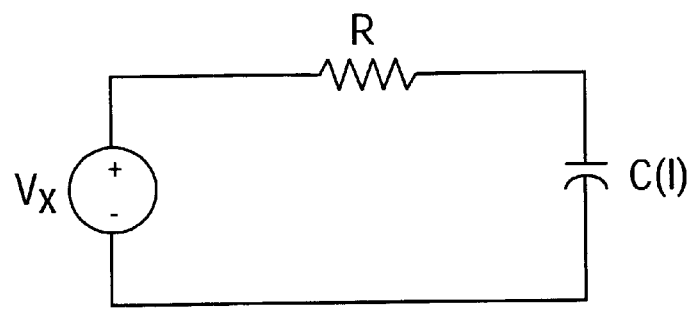
FIG. 2a shows a prior art circuit model of a telephone line.
Figure 2B:
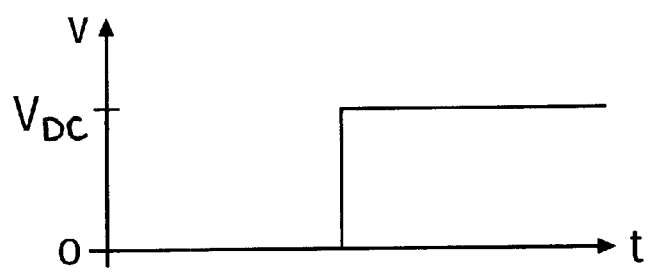
FIG. 2b shows a DC pulse used to probe a telephone line using the prior art system shown in FIG. 1.
Figure 2C:
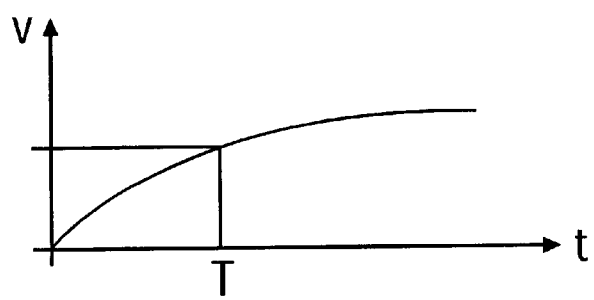
FIG. 2c shows a graph of the charge up time of the telephone line using the prior art system shown in FIG. 1.
Figure 3:
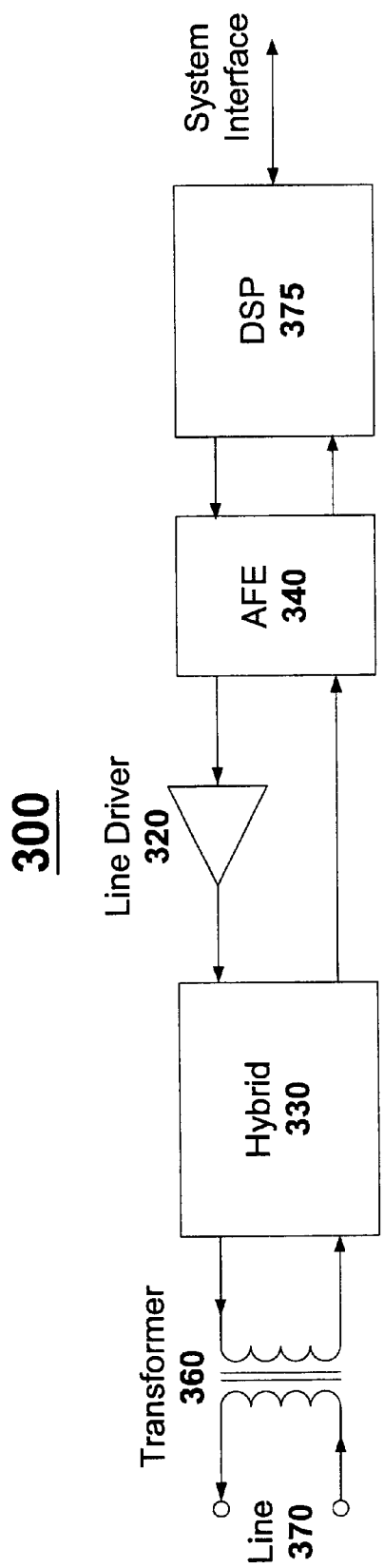
FIG. 3 shows a block diagram of a DSL modem in accordance with one embodiment of the present invention.

FIG. 3 shows a block diagram of a DSL modem 300 in accordance with one embodiment of the present invention. Modem 300 may be one of a number of modems included on a multiple port assembly (e.g., a line card having 48 individual modems and corresponding ports). Alternatively, modem 300 may be a stand-alone modem. Modem 300 includes transformer 370, hybrid 330, line driver 320, analog front end (AFE) 340, and digital signal processor (DSP) 375. Transformer 360 is coupled to the line 370, while the DSP 375 is coupled to a system interface (e.g., ATM network).

Transformer 360 couples the line 370 to the circuitry of modem 300 and provides electrical isolation between line 370 and the modem electronics and network. The turns ratio of transformer 360 is 1:n, where the value of n depends on factors such as the desired line voltage and the specifications of the components included in modem 300. In one embodiment, transformer 360 is configured to allow low frequency access to line 370. In alternative embodiment, transformer 360 includes a switchable high pass filtering mechanism that can be enabled and disabled depending on the mode of operation. In data mode, the high pass filtering mechanism is enabled thereby removing undesirable low frequency signals from the DSL band. In the line probing mode, however, the high pass filtering mechanism is disabled thereby allowing low frequency line probing signals access to and from the DSL band.

Hybrid 330 performs 2-to-4-wire conversion, which converts the bi-directional two-wire signal from the telephone line into two pairs of one-directional transmissions. One pair is for receiving and the other pair is for transmitting. In one embodiment, hybrid 330 is configured to allow low frequency access to and from line 370. In another embodiment, a splitter (e.g., for isolating DSL data and POTS data) is operatively coupled to transformer 360 on the line side. In such an embodiment, the splitter can be switched in or out. For example, when the modem is operating in data mode, the splitter is switched in thereby removing undesired signals (e.g., POTS signals) from the DSL transmission band. On the other hand, when the modem is operating in line probing mode, the splitter is switched out thereby allowing low frequency probing signals access to and from the line 370.

AFE 340 typically includes an analog-to-digital (A/D) converter and a digital-to-analog (D/A) converter. The separated signal received by AFE 340 from hybrid 330 is converted from analog to digital by the A/D converter, and is provided to DSP 375. AFE 340 may further comprise a gain adjust module for optimizing the signal sent to DSP 375. With regards to the transmit direction, data received from the system interface is processed by DSP 375. Such data might be from a customer's data terminal equipment or from the telephone company's network. The digital output of DSP 375 is converted to its analog equivalent by the D/A converter in AFE 340.

The output of AFE 340 is provided to line driver 320. In one embodiment, line driver 320 is configured to allow low frequency access to line 370. In alternative embodiment, line driver 320 includes a switchable high pass filtering mechanism that can be enabled and disabled depending on the mode of operation. In data mode, the high pass filtering mechanism is enabled thereby removing undesirable low frequency signals from the DSL band. In the line probing mode, however, the high pass filtering mechanism is disabled thereby removing allowing low frequency signals access to line 370.

In the embodiment shown, DSP 375 executes a line probing process in accordance with the present invention. The functionality of this line probing process will be discussed in more detail with reference to the discussion of FIG. 5. DSP 375 may also perform a number of other functions. For example, DSP 375 can be used or programmed to perform modulation, coding, error detection, and other algorithm-based functions.

During single ended line probing, line probing signals may be transmitted onto line 370 by modem 300. In one embodiment, samples of the transmitted line probing signals can be kept in a storage (e.g., EEPROM or other memory device) accessible by DSP 375. Upon receiving a request to initiate a line probing sequence, DSP 375 can access the samples from storage and provide them to AFE 340 for conversion to analog form. Alternatively, a programmable signal generator (not shown) can be triggered by DSP 375 to provide the line probing signals. DSP 375 can then provide supplied probing signals to AFE 340 for conversion to analog form. Regardless of the source of the low frequency probing signals, their analog equivalent is driven onto line 370 by line driver 320 by way of hybrid 330 and transformer 360.

The transmitted low frequency probing signals are reflected back to modem 300. The reflected signals are decoupled from the line 370 by transformer 360 and provided to DSP 375 by way of hybrid 330 and AFE 340. In such an embodiment, hybrid 330 is configured for both data mode and line probing mode (e.g., allows for low frequency access to and from line 370). Alternatively, hybrid 330 is effectively bypassed to perform line probing. In one embodiment, a port at the modem side of transformer 360 is coupled directly to AFE 340. In such an embodiment, modem 300 can be dedicated to a line probing function that operates in accordance with the principles of the present invention.

Based on the transmitted and received line probing signals, DSP 375 (or its equivalent) can then measure the transfer function of the line 370. Note that in alternative embodiments, DSP 375 can be replaced by, for example, an ASIC or chip set, or a combination of a DSP and an ASIC, or other equivalent combinations (e.g., a DSP operatively coupled to a signal generator and network analyzer adapted to provide the transmitted probing signals and measure the transfer function of the line based on the transmitted and reflected probing signals). DSP 375 may be integrated with the modem 300, or may be operatively coupled to the modem 300 (e.g., via one or more external port connections). Generally, DSP 375 analyzes the transmitted and reflected probing signals thereby providing information to qualify the line. Qualifying the line may include, for example, measuring the loop length, determining if a short is present, determining if load coils are present, and if so, how many.

Figure 4:
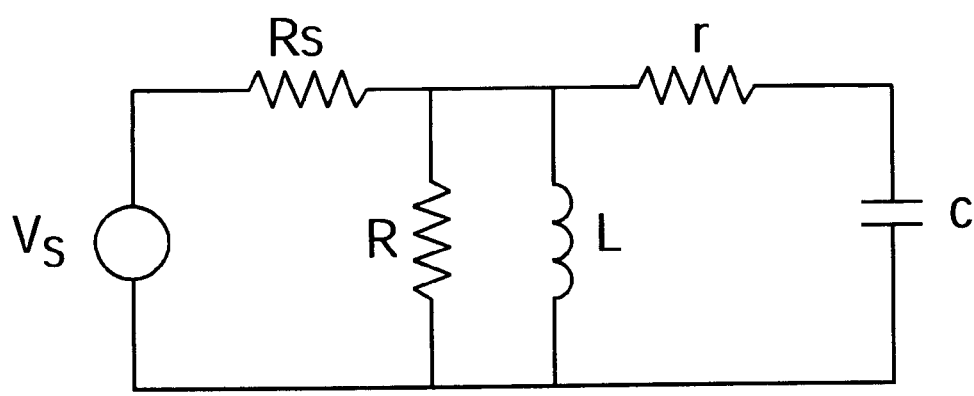
FIG. 4 shows a low frequency RLC model of a modem coupled to a telephone in accordance with one embodiment of the present invention.

A low frequency RLC circuit model of a system including a modem (e.g., modem 300) and a telephone line (e.g., line 370), is shown in FIG. 4. The resonant frequency (which generally corresponds to the peak value of the transfer function) of this RLC circuit model is a function of the length of the telephone line. In this embodiment, L is the primary or modem side inductance of the transformer (e.g., transformer 360), R is the input impedance of the analog front end (e.g., AFE 340), $R_s$ is the line probing signal source impedance, r is the line resistance, and C is the line capacitance. The values of L, R, and $R_s$ are known. The unknown values r and C are linear functions of the loop length, which can be determined based on the measured transfer function. The transfer function $H(j\omega)$ of the loop can be measured by:

$$H(j\omega) = V_o(j\omega)/V_s(j\omega) \quad \text{(Equation 1)}$$

where $V_s(j\omega)$ represents the transmitted line probing signals and $V_o(j\omega)$ represents the reflected line probing signals.

The transfer function $H(j\omega)$ of the RLC circuit model shown in FIG. 4 has a peak frequency that is related to the values of the circuit elements, including r and C. Because r and C are functions of the loop length, the loop length can be determined by measuring the transfer function, and locating the peak frequency of the transfer function.

A lookup table that relates peak frequency of the measured transfer function to the loop length (also referred to as line length) can then be accessed to identify the estimated loop length based on the peak frequency. The lookup table may be generated, for example, by experimental measurement on telephone lines. For instance, the peak frequency for several loops having known lengths can be measured. The length and the corresponding measured peak frequency for each loop may be stored in a lookup table. The peak frequency of a measured transfer function of a loop having an unknown length can then be identified. The length of that loop can then be estimated by comparing the measured peak frequency to the peak frequency entries in the table thereby identifying the associated loop length.

Alternatively, the lookup table may be generated by theoretical analysis of a RLC circuit model. For example, assume that the modem side inductance L of the transformer (e.g., transformer 360), the input impedance R of the analog front end, and the line probing signal source impedance $R_s$. In addition, based on known loop characteristics such as length 1, wire type (e.g., copper), and wire parameters, the line capacitance C and line resistance r can be calculated. More specifically, $$r = \frac{r_{oc}}{3}l, \quad \text{(Equation 2)}$$

and $C = c_\infty 1$ (Equation 3), where the parameters of $r_{OC}$ (copper-DC resistance measured in ohms per kilometer) and $c_\infty$ (contact capacitance measured in nanofarads per kilometer) are wire-dependent parameters. Table 1 illustrates values the parameters of $r_{OC}$ and $c_\infty$ for typically used wire types. Other wire types not shown in Table 1 are also associated with known $r_{OC}$ and $c_\infty$ values. Note that as these parameters do not change significantly from one wire type to another. As such, average values (among typical different wire types) for each of these parameters can be used with negligible impact on accuracy.

TABLE 1

| Wire Type | $r_{oc}$ (Ω/Km) | $c_\infty$ (nF/Km) |
|---|---|---|
| 26AWG | 286.18 | 49 |
| 24AWG | 174.56 | 50 |

Once these values are known for a given loop length 1, the corresponding peak frequency value for that particular loop length 1 can be calculated as shown here in Equations 4 through 6. The transfer function of the RLC circuit model shown in FIG. 4 is:

$$H(s) = \frac{v_o}{v_s} = \frac{sLR(sCr+1)}{s^2 LC(RR_s + rR_s + rR) + s(LR_s + rRR_sC + LR) + RR_s} \quad \text{(Equation 4)}$$

The peak frequency of the transfer function can be theoretically calculated by taking the derivative of $|H(s)|^2 s = j\omega$ with respect to $\omega$, and setting the derivative equal to zero, as shown in Equation 5.

$$(-H^2F^2 + E^2(M^2 - 2NH))x^2 + 2E^2N^2x + F^2N^2 = 0 \quad \text{(Equation 5)}$$

where $x = \omega^2$; E=LRCr; F=LR; $H = LC(RR_s + rR_s + rR)$; $M = (LR_s + rRR_sC + LR)$; and $N = RR_s$. The peak frequency is then found by:

$$f_{peak} = \frac{1}{2\pi}\sqrt{x^*} \quad \text{(Equation 6)}$$

where $x^*$ is the positive solution of Equation 5. A lookup table can be stocked with a number of such calculated peak frequencies and the corresponding loop lengths.

Table 1 shows an example of a theoretically generated lookup table for AWG26 type wire with typical circuit model parameters. The number of entries in the lookup table depends on factors such as the desired degree of accuracy and the available memory. For example, there can be a peak frequency entry for every 100 meters of loop length. This lookup table may be stored in a computer readable memory (e.g., EEPROM or flash memory) in the DSL modem. Note that no prior knowledge of the American wire gauge (AWG) is needed to produce the table assuming average values for parameters $r_{OC}$ and $c_\infty$.

TABLE 2

| Loop Length (Km) | Peak Frequency (Hz) |
|---|---|
| 1.0 | 3205 |
| 1.5 | 2605 |
| 2.0 | 2255 |
| 2.5 | 2025 |
| . | . |
| . | . |
| 5 | 1965 |

Regardless of whether a lookup table is stocked with empirical or theoretical data, the peak frequency of a measured transfer function can be compared to the peak frequency values entered in the table. The loop length table entry corresponding to a matching peak frequency table entry can be used as the estimated length of the line being qualified. If the peak frequency of the measured transfer function is not actually included in the table, then an interpolation can be performed between the entries of the lookup table. For example (assume Table 2 values), if the peak frequency of the measured transfer function is 2100 Hz, then the linear interpolated loop length would be 2.3369 Km. In other cases, a higher order interpolation can be used for greater accuracy.

The measured transfer function can also be used to determine whether the line has a short circuit, or whether one or more load coils are connected to the line. Load coils are generally used to enhance voice transmission over a telephone line. However, load coils prevent digital data from being transmitted over the line thereby precluding deployment of DSL service on that particular line. As such, identifying the presence of such load coils is a necessary step in qualifying a line for DSL service.

In general, if the measured transfer function has a single peak whose amplitude is above a given threshold, then there are no load coils or short circuits in the line. The peak frequency can then be used to identify a corresponding loop length. If the peak amplitude of the measured transfer function is below a given threshold, however, then the line typically has a short circuit. For example, if the peak amplitude of the measured transfer function computes to 0.1 or less, then the line is shorted. Assuming no short is detected, then the line can be tested for the presence of load coils. More specifically, if the measured transfer function has multiple peaks, then one or more load coils are attached to the line. Generally, the number of load coils attached to the line is equal to the total number of peaks minus one.

Figure 5:
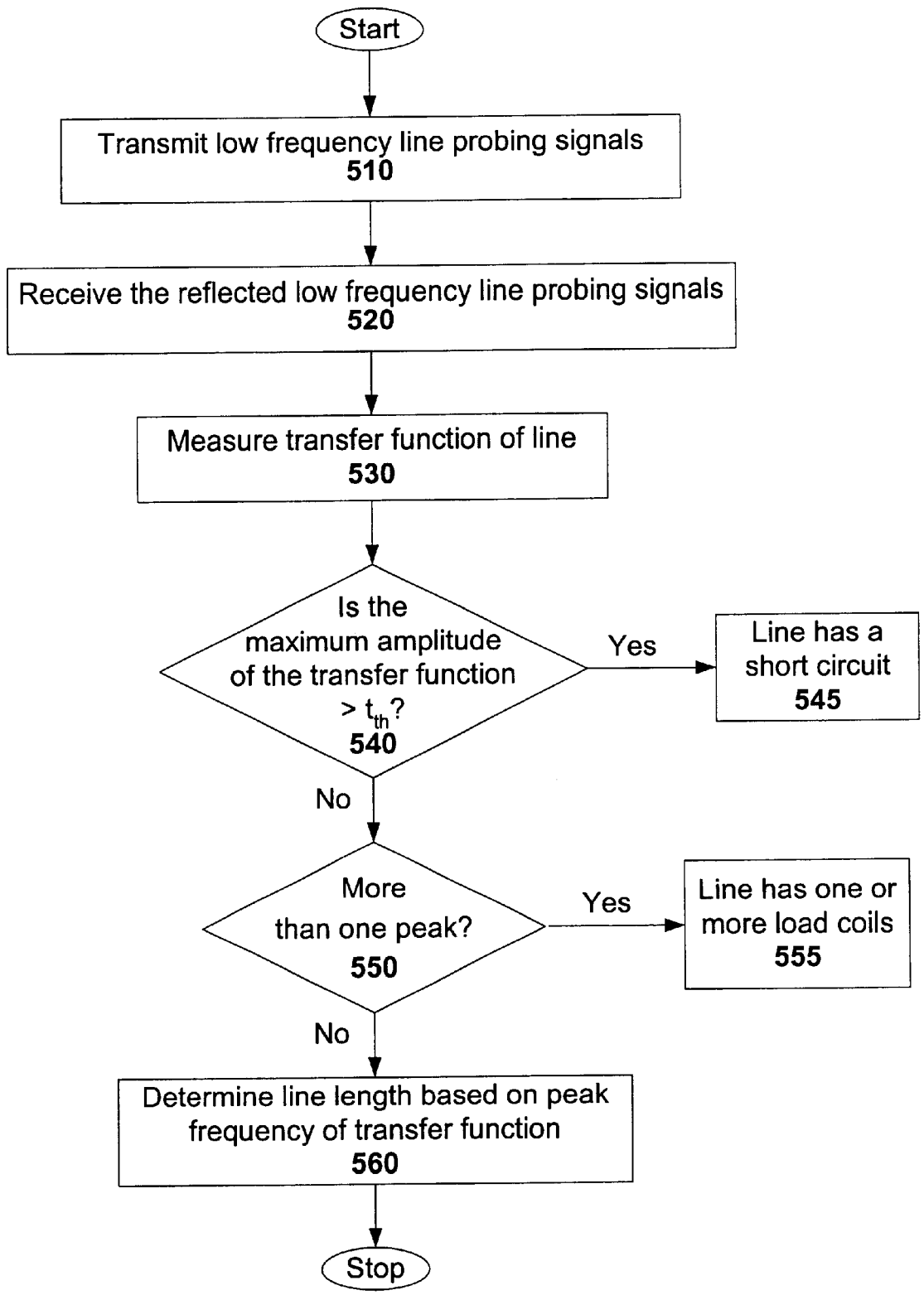
FIG. 5 shows a method for single ended line probing in accordance with one embodiment of the present invention.

FIG. 5 illustrates a method for single ended line probing in accordance with one embodiment of the present invention. Low frequency line probing signals (e.g., sinusoids ranging from 0.5 KHz to 3.5 KHz) are transmitted 510 from a DSL modem onto a line (e.g., copper telephone line). These line probing signals are reflected back from the line and received 520 by the DSL modem. The transfer function of the line is measured 530 based on the transmitted and received line probing signals. The maximum absolute amplitude of the measured transfer function is compared 540 to a predetermined threshold ($t_{th}$). If the maximum absolute value is less than the threshold, then the line has a short circuit, as indicated at 545.

Otherwise, the method determines 550 whether the number of peaks of the measured transfer function is greater than one. If the number of peaks is greater than one, then one or more load coils are attached to the telephone line, as indicated by 555. If the measured transfer function has only one peak, then the length of the line is determined 560 based on the peak frequency of the measured transfer function. A lookup that associates peak frequency with line length can be accessed in performing step 560.

Figure 6:
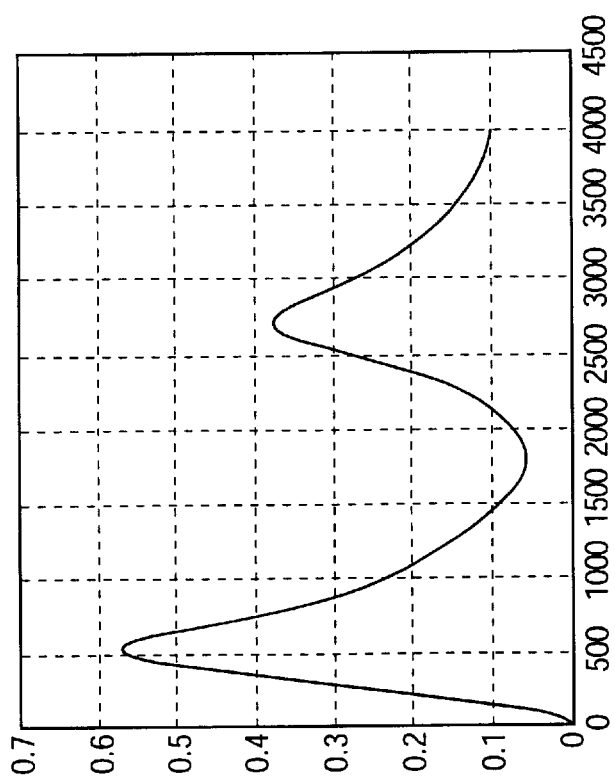
FIGS. 6, 7 and 8 show transfer functions measured using a method for single ended line probing in accordance with one embodiment of the present invention.
Figure 7:
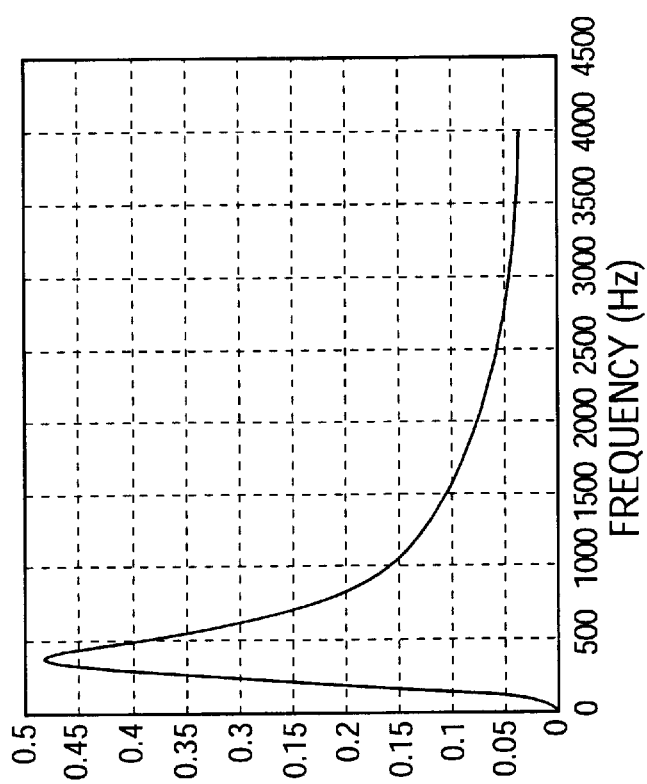
Figure 8:
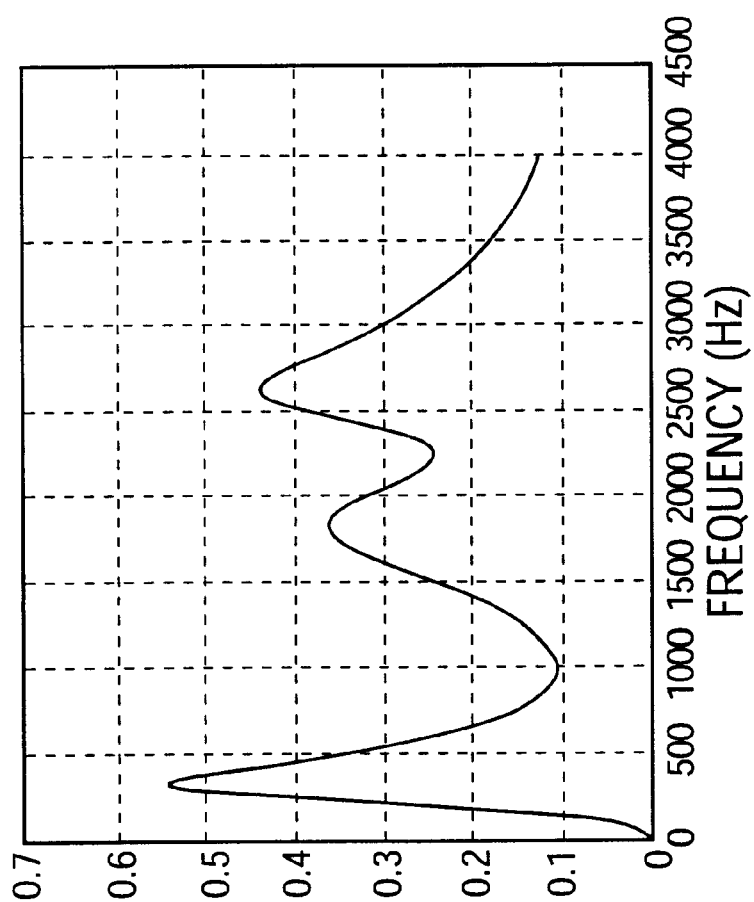

FIG. 6 shows the measured transfer function for a long loop. The example transfer function has a single peak value at approximately 380 Hertz (Hz). The length of the line can be determined based on this peak frequency by, for example, using a lookup table as previously explained. FIG. 7 shows a measured transfer function that has two peaks. More specifically, this example transfer function has a first peak value at approximately 595 Hz, and a second peak frequency at approximately 2700 Hz. This particular transfer function indicates that one load coil is attached to the line. FIG. 8 shows a measured transfer function with three peaks (e.g., 480 Hz, 1790 Hz and 2640 Hz) thereby indicating that two load coils are attached to the line.

Figure 9:
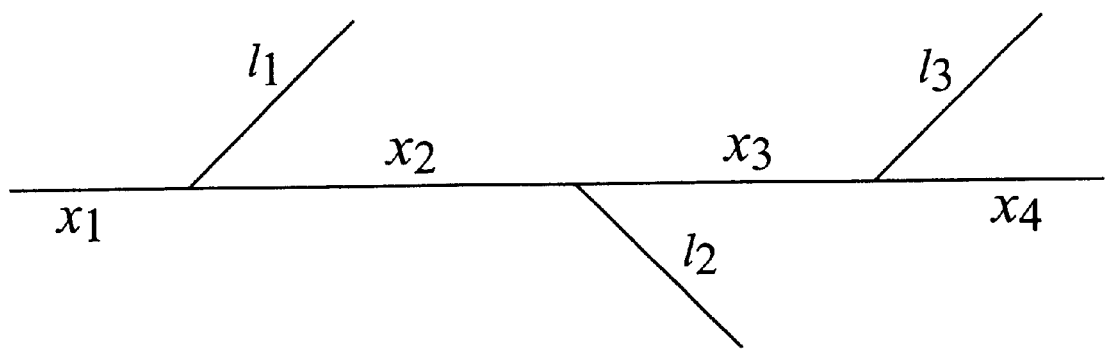
FIG. 9 shows a line with three bridge-taps in accordance with one embodiment of the present invention.

Single ended line probing in accordance with the present invention can also provide an estimate of the loop length in the presence of bridged taps. A bridge tap is a branch in the loop. A line may have several bridge-taps with different lengths. FIG. 9 shows a telephone line with three bridge-taps. In this embodiment, $x_1$, $x_2$, $x_3$ and $x_4$ are sections of the telephone line, and $l_1$, $l_2$ and $l_3$ are bridge-taps attached to the telephone line. The equivalent length of the loop ($l_{equivalent}$) can be estimated in accordance with the principles of the present invention. For instance, the estimated length of the loop illustrated in FIG. 9 would be:

$$l_{equivalent} = \sum_{i=1}^{4} x_i + \sum_{i=1}^{3} l_i \quad \text{(Equation 7)}$$

Note that the equivalent loop length ($l_{equivalent}$) is the sum of the lengths (e.g., $x_1$, $x_2$, $x_3$ and $x_4$) of the main loop (e.g., $x_1$, $x_2$, $x_3$ and $x_4$) and all the bridge taps ($l_1$, $l_2$ and $l_3$). This estimated equivalent loop length is a good indicator of the loop performance. Note that if the overall length of the bridged taps is negligible compared to the main loop length, the equivalent loop length will be close to the main loop length.

These and other embodiments of the present invention may be realized in accordance with these teachings and it should be evident that various modifications and changes may be made in light of these teachings without departing from the broader spirit and scope of the invention. The specification and drawings are, accordingly, to be regarded in an illustrative rather than restrictive sense and the invention measured only in terms of the claims.

What is claimed is:

1. A method of qualifying a telephone line for digital subscriber line (DSL) services using a Central Office (CO) DSL modem, comprising:
   transmitting from the CO DSL modem low frequency signals over the telephone line, wherein the low frequency signals are transmitted through circuitry in the CO DSL modem;
   receiving reflected versions of the low frequency signals from the telephone line;
   measuring at the CO DSL modem a transfer function based on the transmitted low frequency signals and received reflected versions of the low frequency signals, wherein the transfer function models characteristics of the telephone line and the circuitry in the CO DSL modem; and
   qualifying the telephone line based on the transfer function.

2. The method of claim 1, wherein the qualifying step includes:
   comparing a peak amplitude of the transfer function to a predetermined threshold; and
   determining that the telephone line is short circuited if the transfer function is less than the predetermined threshold.

3. The method of claim 1, wherein the qualifying step includes:
   counting a number of peaks associated with the transfer function, thereby defining a number of peaks; and
   determining that at least one load coil is attached to the telephone line if the number of peaks is greater than one.

4. The method of claim 1, wherein the qualifying step includes:
   determining the length of the telephone line based on a peak frequency of the transfer function.

5. The method of claim 4, wherein the peak frequency of the transfer function is compared to a number of peak frequency values in a lookup table, and each peak frequency value in the lookup table corresponds to a line length value included in the lookup table.

6. The method of claim 5, wherein each of the peak frequency values is a measured peak frequency associated with a telephone line having a known length, and the corresponding line length value in the lookup table is the known length.

7. The method of claim 5, wherein each of the peak frequency values is a theoretical peak frequency based on a calculated transfer function of a telephone line having a known length, and the corresponding line length value is the known length.

8. The method of claim 7, wherein line parameter values of $r_{OC}$ and $c_\infty$ for a number of wire types are averaged thereby providing an average $r_{OC}$ value and an average $c_\infty$ value, wherein the average $r_{OC}$ value, the average $c_\infty$ value, and the known length are used to calculate telephone line resistance and telephone line capacitance of the transfer function thereby allowing each theoretical peak frequency value to be calculated without prior knowledge of specific line parameters associated with the telephone line having the known length.

9. A Central Office (CO) digital subscriber line (DSL) modem configured to determine if a telephone line qualifies for DSL service, the modem comprising:

means for transmitting from the CO DSL modem low frequency signals over the telephone line, wherein the low frequency signals are transmitted through circuitry in the CO DSL modem;

means for receiving reflected versions of the low frequency signals from the telephone line;

means for measuring at the CO DSL modem a transfer function based on the transmitted low frequency signals and received reflected versions of the low frequency signals, wherein the transfer function models characteristics of the telephone line and the circuitry in the CO DSL modem; and means for qualifying the telephone line based on the transfer function.

10. The modem of claim 9, wherein the means for qualifying further includes:

a means for comparing a peak amplitude of the transfer function to a predetermined threshold; and a means for determining that the telephone line is short circuited if the transfer function is less than the predetermined threshold.

11. The modem of claim 9, wherein the means for qualifying further includes:

a means for counting a number of peaks associated with the transfer function, thereby defining a number of peaks; and a means for determining that at least one load coil is attached to the telephone line if the number of peaks is greater than one.

12. The modem of claim 9, wherein the means for qualifying further includes:

a means for determining the length of the telephone line based on a peak frequency of the transfer function.

13. The modem of claim 12, wherein the peak frequency of the transfer function is compared to a number of peak frequency values in a lookup table, each peak frequency value in the lookup table associated with a telephone line length.

14. A method for determining if a telephone line qualifies for digital subscriber line (DSL) service, the method comprising:

transmitting from a Central Office (CO) DSL modem low frequency signals over the telephone line, wherein the low frequency signals are transmitted through circuitry in the CO DSL modem;

receiving reflected versions of the low frequency signals from the telephone line;

measuring at the CO DSL modem a transfer function based on the transmitted low frequency signals and received reflected versions of the low frequency signals, wherein the transfer function models characteristics of the telephone line and the circuitry in the CO DSL modem;

in response to determining that a peak amplitude of the transfer function is less than a predetermined threshold, determining that the telephone line is short circuited;

in response to the transfer function having more than one peak, determining that at least one load coil is attached to the telephone line;

in response to no short circuits or load coils being associated with the telephone line:
  comparing a peak frequency of the transfer function to a number of peak frequency values, each peak frequency value associated with a length value; and
  estimating the length of the telephone line based on one or more of the peak frequency values and their associated length values.

15. The method of claim 14, wherein each of the peak frequency values and corresponding length values are included in the lookup table.

16. The method of claim 14, wherein each of the peak frequency values is a measured peak frequency associated with a telephone line having a known length, and the corresponding length value is the known length.

17. The method of claim 14, wherein each of the peak frequency values is a theoretical peak frequency based on a calculated transfer function of a telephone line having a known length, and the corresponding length value is the known length.

18. The method of claim 17, wherein line parameter values of $r_{OC}$ and $c_\infty$ for a number of wire types are averaged thereby providing an average $r_{OC}$ value and an average $c_\infty$ value, wherein the average $r_{OC}$ value, the average $c_\infty$ value, and the known length are used to calculate telephone line resistance and telephone line capacitance of the transfer function thereby allowing each theoretical peak frequency value to be calculated without prior knowledge of specific line parameters associated with the telephone line having the known length.

19. The method of claim 14, wherein the steps of the method are effected by a set of instructions executing on a digital signal processor included in a modem operatively coupled to the telephone line.

20. A computer-readable medium including instructions which, when executed by a processor in a Central Office (CO) digital subscriber line (DSL) modem, cause the modem to perform the operations of:

transmitting from the CO DSL modem low frequency signals over the telephone line;

receiving reflected versions of the low frequency signals from the telephone line, wherein the low frequency signals are transmitted through circuitry in the CO DSL modem;

measuring a transfer function based on the transmitted low frequency signals and received reflected versions of the low frequency signals, wherein the transfer function models characteristics of the telephone line and the circuitry in the CO DSL modem;

in response to determining that a peak amplitude of the transfer function is less than a predetermined threshold, determining that the telephone line is short circuited;

in response to the transfer function having more than one peak, determining that at least one load coil is attached to the telephone line;

in response to no short circuits or load coils being associated with the telephone line:
comparing a peak frequency of the transfer function to a number of peak frequency values stored in a lookup table, each peak frequency value in the lookup table associated with a length value included in the lookup table; and
estimating the length of the telephone line based on one or more of the peak frequency values and their associated length values.

21. A computer-readable medium having instructions contained thereon, which, when executed by a processor in a Central Office (CO) digital subscriber line (DSL) modem, cause the processor to perform the operations of:
transmitting from the CO DSL modem low frequency signals over the telephone line, wherein the low frequency signals are transmitted through circuitry in the CO DSL modem;
receiving reflected versions of the low frequency signals from the telephone line;
measuring at the DSL modem a transfer function based on the transmitted low frequency signals and received reflected versions of the low frequency signals, wherein the transfer function models characteristics of the telephone line and the circuitry in the CO DSL modem; and
qualifying the telephone line based on the transfer function.

22. A Central Office (CO) digital subscriber line (DSL) modem for qualifying a telephone line for DSL services, comprising:
a processor;
a memory containing instructions, which, when executed by the processor, cause the processor to perform the operations of:
transmitting from the CO DSL modem signals over the telephone line, wherein the low frequency signals are transmitted through circuitry in the CO DSL modem;
receiving reflected versions of the signals from the telephone line;
measuring at the CO DSL modem a transfer function based on the transmitted and received reflected versions of the signals, wherein the transfer function models characteristics of the telephone line and the circuitry in the CO DSL modem; and
qualifying the telephone line based on the transfer function.

* * * * *